(12) United States Patent
Johnsen et al.

(10) Patent No.: US 8,874,742 B2
(45) Date of Patent: Oct. 28, 2014

(54) SYSTEM AND METHOD FOR SUPPORTING VIRTUAL MACHINE MIGRATION IN A MIDDLEWARE MACHINE ENVIRONMENT

(75) Inventors: Bjørn Dag Johnsen, Oslo (NO); Martin Paul Mayhead, Hindhead (GB); Ola Tørudbakken, Oslo (NO)

(73) Assignee: Oracle International Corporation, Redwood Shores, CA (US)

( * ) Notice: Subject to any disclaimer, the term of this patent is extended or adjusted under 35 U.S.C. 154(b) by 4 days.

(21) Appl. No.: 13/546,405

(22) Filed: Jul. 11, 2012

(65) Prior Publication Data

US 2013/0019014 A1    Jan. 17, 2013

Related U.S. Application Data

(60) Provisional application No. 61/506,557, filed on Jul. 11, 2011.

(51) Int. Cl.
*G06F 15/173* (2006.01)
*H04L 29/08* (2006.01)
*H04L 12/18* (2006.01)

(52) U.S. Cl.
CPC ........ *H04L 12/1863* (2013.01); *H04L 67/2814* (2013.01); *H04L 12/1836* (2013.01)
USPC ............................... 709/225; 709/248; 718/1

(58) Field of Classification Search
None
See application file for complete search history.

(56) References Cited

U.S. PATENT DOCUMENTS

| | | |
|---|---|---|
| 6,038,233 A | 3/2000 | Hamamoto et al. |
| 6,148,336 A | 11/2000 | Thomas et al. |
| 6,308,148 B1 | 10/2001 | Bruins et al. |
| 6,826,694 B1 | 11/2004 | Dutta et al. |
| 6,941,350 B1 | 9/2005 | Frazier |
| 6,981,025 B1 | 12/2005 | Frazier et al. |
| 7,113,995 B1 | 9/2006 | Beukema et al. |
| 7,290,277 B1 | 10/2007 | Chou et al. |
| 7,721,324 B1 | 5/2010 | Jackson |
| 7,894,440 B2 | 2/2011 | Xu et al. |

(Continued)

FOREIGN PATENT DOCUMENTS

| | | |
|---|---|---|
| EP | 1 128 607 A2 | 8/2001 |
| EP | 2160068 A1 | 3/2010 |
| WO | 2012037518 | 3/2012 |

OTHER PUBLICATIONS

International Search Report dated Sep. 23, 2013 for Application No. PCT/US2013/040639, 10 pages.

(Continued)

*Primary Examiner* — Mohamed Ibrahim
(74) *Attorney, Agent, or Firm* — Meyer IP Law Group

(57) ABSTRACT

A system and method can support virtual machine migration in a middleware machine environment. The middleware machine environment can comprise one or more network switch instances with one or more external ports, each of which is adapted to receive data packets from an external network. Furthermore, the middleware machine environment can comprise a plurality of virtual interfaces on one or more host servers. Each host server is associated with one or more virtual machines that can process the one or more data packets. A virtual machine on a first host server is allowed to migrate from the first host server to a second host server and operates to receive one or more packets via a virtual interface on the second host server and process the one or more data packets.

20 Claims, 5 Drawing Sheets

(56) References Cited

U.S. PATENT DOCUMENTS

| | | |
|---|---|---|
| 2002/0016858 A1 | 2/2002 | Sawada |
| 2004/0037279 A1 | 2/2004 | Zelig et al. |
| 2004/0123142 A1 | 6/2004 | Dubal et al. |
| 2005/0100033 A1 | 5/2005 | Arndt et al. |
| 2006/0100033 A1 | 5/2006 | Nelson et al. |
| 2007/0022479 A1 | 1/2007 | Sikdar et al. |
| 2007/0073882 A1 | 3/2007 | Brown et al. |
| 2008/0159277 A1 | 7/2008 | Vobbilisetty |
| 2009/0019505 A1 | 1/2009 | Gopalakrishnan et al. |
| 2009/0073895 A1 | 3/2009 | Morgan |
| 2009/0080328 A1 | 3/2009 | Hu et al. |
| 2009/0222558 A1* | 9/2009 | Xu et al. ............... 709/224 |
| 2009/0262741 A1 | 10/2009 | Jungck et al. |
| 2010/0054129 A1 | 3/2010 | Kuik et al. |
| 2010/0103837 A1 | 4/2010 | Jungck et al. |
| 2010/0257269 A1* | 10/2010 | Clark ....................... 709/226 |
| 2010/0275199 A1* | 10/2010 | Smith et al. ................ 718/1 |
| 2010/0287548 A1* | 11/2010 | Zhou et al. ................ 718/1 |
| 2011/0023108 A1 | 1/2011 | Geldermann et al. |
| 2011/0131447 A1 | 6/2011 | Prakash et al. |
| 2011/0246669 A1* | 10/2011 | Kanada et al. ............. 709/238 |
| 2011/0299537 A1* | 12/2011 | Saraiya et al. ............. 370/392 |
| 2012/0131225 A1* | 5/2012 | Chiueh et al. ............. 709/246 |
| 2012/0173757 A1* | 7/2012 | Sanden ..................... 709/238 |
| 2012/0291028 A1* | 11/2012 | Kidambi et al. ............ 718/1 |
| 2012/0307826 A1* | 12/2012 | Matsuoka ................. 370/390 |
| 2012/0314706 A1 | 12/2012 | Liss et al. |
| 2012/0331142 A1* | 12/2012 | Mittal et al. .............. 709/225 |
| 2013/0232492 A1* | 9/2013 | Wang ....................... 718/1 |

OTHER PUBLICATIONS

Lee, M. et al., "Security Enhancement in Infiniband Architecture," Proceedings of the 19th IEEE International Parallel and Distributed Processing Symposium, Denver, Colorado, Apr. 4-8, 2005, Piscataway, New Jersey, Apr. 4, 2005, 18 pages.

Sun Infiniband Dual Port 4x QDR PCIe ExpressModule and Low Profile Host Channel Adapters M2, Frequently Asked Questions, Sep. 21, 2010, http://www.oracle.com/us/products/servers-storage/networking/infiniband/sun-qdr-ib-hcas-faq-172841.pdf, retrieved on Sep. 11, 2012, 4 pages.

International Search Report dated Sep. 26, 2013 for Application No. PCT/US2013/040656, 10 pages.

International Searching Authority at the European Patent Office, International Search Report and Written Opinion for PCT International Application No. PCT/US2012/046225, Oct. 11, 2012, 10 pages.

International Searching Authority at the European Patent Office, International Search Report and Written Opinion for PCT International Application No. PCT/US2012/046219, Mar. 1, 2013, 17 pages.

International Searching Authority At the European Patent Office, International Search Report and Written Opinion for PCT International Application No. PCT/US2012/046225, Oct. 11, 2012, 10 pp.

International Searching Authority At the European Patent Office, International Search Report and Written Opinion for PCT International Application No. PCT/US2012/046219, Mar. 1, 2013, 17 pp.

* cited by examiner

SYSTEM AND METHOD FOR SUPPORTING VIRTUAL MACHINE MIGRATION IN A MIDDLEWARE MACHINE ENVIRONMENT

CLAIM OF PRIORITY

This application claims priority to U.S. Provisional Patent Application No. 61/506,557, entitled "SYSTEM AND METHOD FOR USING UNICAST AND MULTICAST FLOODING MECHANISMS TO PROVIDE EoIB GATEWAY vNICs" filed Jul. 11, 2011, which application is herein incorporated by reference.

CROSS REFERENCE TO RELATED APPLICATIONS

The application is related to the following patent applications, which are hereby incorporated by reference in its entirety:

U.S. patent application Ser. No. 13/546,217, entitled "SYSTEM AND METHOD FOR USING A MULTICAST GROUP TO SUPPORT A FLOODING MECHANISM IN A MIDDLEWARE MACHINE ENVIRONMENT", filed Jul. 11, 2012, U.S. patent application Ser. No. 13/546,236, entitled "SYSTEM AND METHOD FOR USING A PACKET PROCESS PROXY TO SUPPORT A FLOODING MECHANISM IN A MIDDLEWARE MACHINE ENVIRONMENT", filed Jul. 11, 2012, U.S. patent application Ser. No. 13/546,261, entitled "SYSTEM AND METHOD FOR SUPPORTING A SCALABLE FLOODING MECHANISM IN A MIDDLEWARE MACHINE ENVIRONMENT", filed Jul. 11, 2012, and U.S. patent application Ser. No. 13/546,368, entitled "SYSTEM AND METHOD FOR SUPPORTING DIRECT PACKET FORWARDING IN A MIDDLEWARE MACHINE ENVIRONMENT", filed Jul. 11, 2012.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software such as middleware, and is particularly related to supporting a middleware machine environment.

BACKGROUND

The interconnection network plays a beneficial role in the next generation of super computers, clusters, and data centers. High performance network technology, such as the INFINIBAND (IB) technology, is replacing proprietary or low-performance solutions in the high performance computing domain, where high bandwidth and low latency are the key requirements. For example, IB installations are used in supercomputers such as Los Alamos National Laboratory's Roadrunner, Texas Advanced Computing Center's Ranger, and Forschungszentrum Juelich's JuRoPa.

IB was first standardized in October 2000 as a merge of two older technologies called Future I/O and Next Generation I/O. Due to its low latency, high bandwidth, and efficient utilization of host-side processing resources, it has been gaining acceptance within the High Performance Computing (HPC) community as a solution to build large and scalable computer clusters. The de facto system software for IB is OpenFabrics Enterprise Distribution (OFED), which is developed by dedicated professionals and maintained by the OpenFabrics Alliance. OFED is open source and is available for both GNU/Linux and Microsoft Windows.

SUMMARY

Described herein is a system and method for supporting a flooding mechanism in a middleware machine environment. The middleware machine environment can comprise one or more network switch instances with one or more external ports, each of which is adapted to receive data packets from an external network. Furthermore, the middleware machine environment can comprise a plurality of virtual interfaces on one or more host servers. Each said host server is associated with one or more virtual machines that can process the one or more data packets. A virtual machine on a first host server is allowed to migrate from the first host server to a second host server and operates to receive one or more packets via a virtual interface on the second host server and process the one or more data packets.

DETAILED DESCRIPTION

Described herein is a system and method for providing a middleware machine or similar platform. In accordance with an embodiment of the invention, the system comprises a combination of high performance hardware, e.g. 64-bit processor technology, high performance large memory, and redundant INFINIBAND and Ethernet networking, together with an application server or middleware environment, such as WebLogic Suite, to provide a complete JAVA EE application server complex which includes a massively parallel in-memory grid, that can be provisioned quickly, and can scale on demand. In accordance with an embodiment, the system can be deployed as a full, half, or quarter rack, or other configuration, that provides an application server grid, storage area network, and INFINIBAND (IB) network. The middleware machine software can provide application server, middleware and other functionality such as, for example, WebLogic Server, JRockit or Hotspot JVM, Oracle Linux or Solaris, and Oracle VM. In accordance with an embodiment, the system can include a plurality of compute nodes, IB switch gateway, and storage nodes or units, communicating with one another via an IB network. When implemented as a rack configuration, unused portions of the rack can be left empty or occupied by fillers.

In accordance with an embodiment of the invention, referred to herein as "Sun Oracle Exalogic" or "Exalogic", the system is an easy-to-deploy solution for hosting middleware or application server software, such as the Oracle Middleware SW suite, or Weblogic. As described herein, in accordance with an embodiment the system is a "grid in a box" that comprises one or more servers, storage units, an IB fabric for storage networking, and all the other components required to host a middleware application. Significant performance can be delivered for all types of middleware applications by leveraging a massively parallel grid architecture using, e.g. Real Application Clusters and Exalogic Open storage. The system delivers improved performance with linear I/O scalability, is simple to use and manage, and delivers mission-critical availability and reliability.

Middleware Machine Environment

Figure 1:
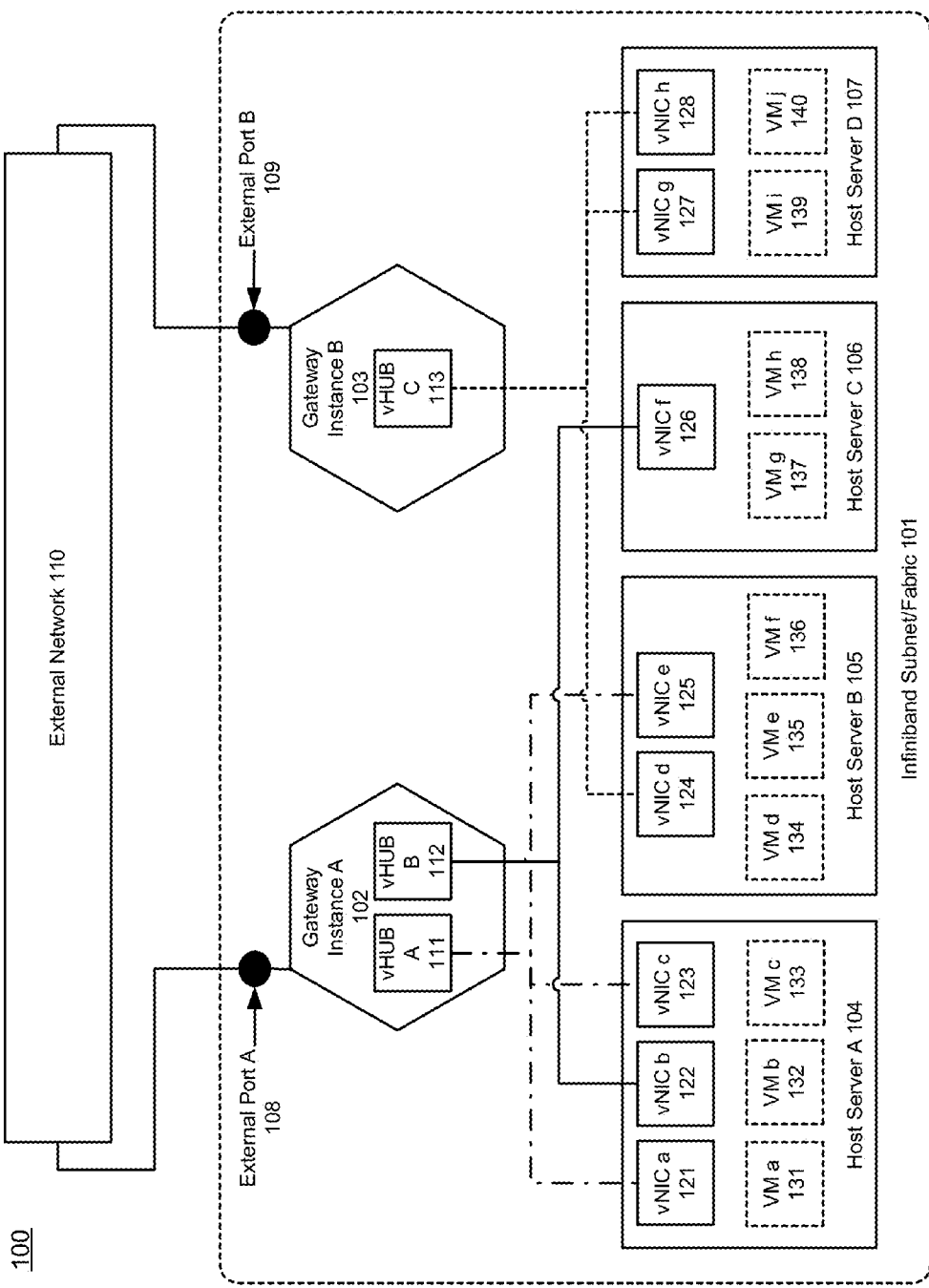
FIG. 1 shows an illustration of a middleware machine environment, in accordance with an embodiment of the invention.

FIG. 1 shows an illustration of a middleware machine environment, in accordance with an embodiment of the invention. As shown in FIG. 1, a middleware machine environment 100 can include an IB fabric 101 that connects to an external network 110 using one or more gateway instances 102-103. The IB fabric also includes a plurality of host servers 104-107 (each of which can be hardware itself or software running on top of a physical host server), which contains a plurality of virtual machines (VMs) 131-140. Each gateway instance A-B 102-103 can be associated with an external port 108-109 that can receive data packets from the external network 110. As shown in FIG. 1, external port A 108 is associated with gateway instance A 102, and external port B 109 is associated with gateway instance B 103.

Additionally, the host servers provides a plurality of virtual interfaces, such as virtual network interface cards (vNICs) 121-128, for receiving data packets from the external network via the gateway instances A-B 102-103. The gateway instances 102-103 can define and maintain one or more virtual hubs (vHUBs) 111-113, each of which defines a logical layer 2 (L2) link on the IB fabric side that contains vNICs associated with the same gateway instance. Furthermore, the vNICs and the hosts that belong to the same vHUB can communicate with each other without involving the associated gateway instance.

As shown in FIG. 1, vHUB A 111 on gateway A is associated with vNIC a 121 and vNIC c 123 on host server A, and vNIC e 125 on host server B. Also, vHUB B 112 on gateway A is associated with vNIC b 122 on host server A and vNIC f 126 on host server C; and vHUB C 113 on gateway B is associate with vNIC d 124 on host server B, and vNIC g 127 and vNIC h 128 on host server D.

Figure 2:
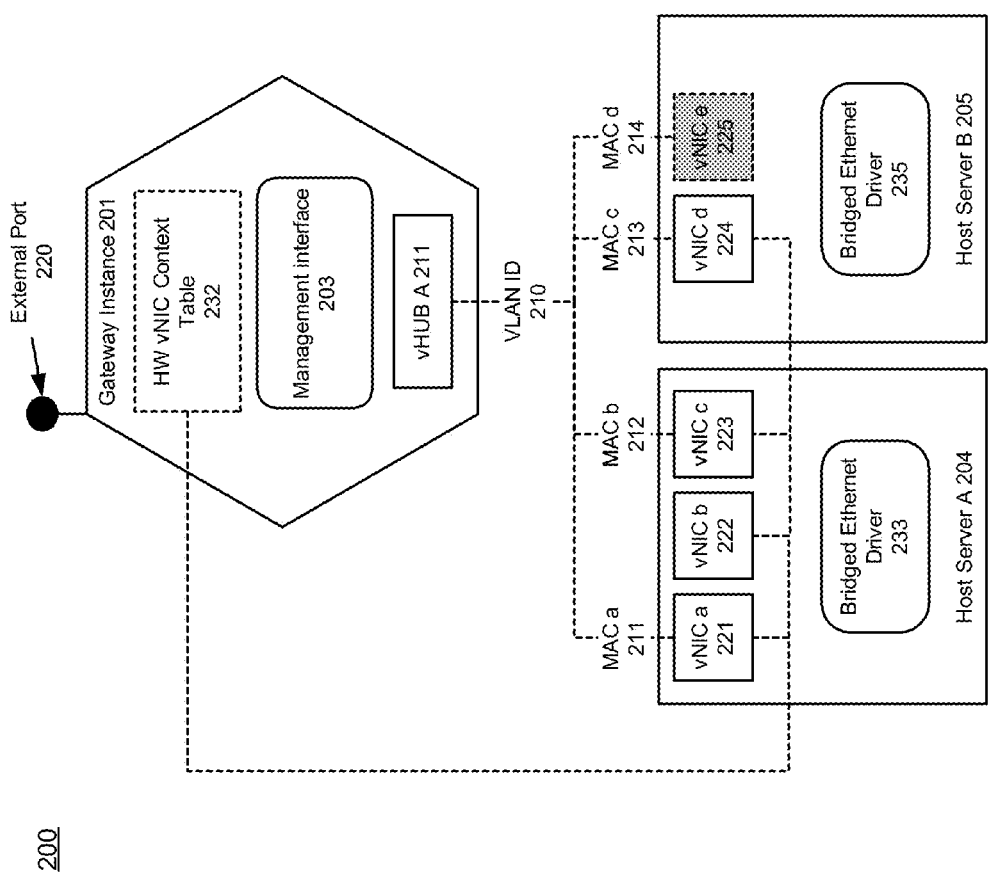
FIG. 2 shows an illustration of a virtual hub (vHUB) that includes various vNICs associated with different types of context, in accordance with an embodiment of the invention.

FIG. 2 shows an illustration of a virtual hub (vHUB) that includes various vNICs, in accordance with an embodiment of the invention. As shown in FIG. 2, a middleware machine environment 200 includes a gateway instance 201 and several host servers 204-205 or hypervisors. The gateway instance 201, which comprises an external port 220, can maintain a virtual hub (vHUB), vHUB A 211. The vHUB A 211 can be assigned with a unique virtual LAN ID (VLAN ID) 210. Additionally, the vHUB A 211 can include various vNICs 221, 223-225, each of which is assigned with a Media Access Control (MAC) address 211-214. Each logical vNIC 221, 223-225 can be represented by a MAC/VLAN ID combination associated with a specific Host Channel Adaptor (HCA) port.

A vNIC in the IB fabric can be uniquely identified using a virtual Ethernet interface (VIF), which includes a combination of a VLAN ID and a MAC address. Also, when the VIFs are used concurrently in the same vHub in a gateway instance, different MAC addresses are used for the different VIFs. Additionally, the system can perform an address translation from an Ethernet layer 2 MAC address to an IB layer 2 address that uses local identifier (LID)/global identifier (GID) and queue pair number (QPN).

Furthermore, the gateway instance 201 can include a hardware vNIC context table 232, which contains various entries or hardware vNIC contexts. The hardware vNIC context table 232 can be stored in a memory of the gateway instance 201. When a host driver is sending packets to the external Ethernet via the IB fabric and the gateway 201, this hardware vNIC context table 232 can be used to verify that the correct source address information is used by the correct host. The hardware context table 232 can also be used to look up the correct host HCA port address on the IB fabric and QPN within that HCA, when packets are received by the gateway from the external Ethernet. Additionally, the hardware vNIC contexts can be used to directly steer packets for a specific logical vNIC to a dedicated receive queue in the designated host context/memory.

The gateway instance 201, which can be hardware itself or a software running on top of a hardware switch, allows the use of network managed vNIC allocation. The management interface 203 on the gateway instance 201, e.g. a NM2-GW service processor, can be used to allocate hardware vNIC contexts on behalf of specific host (HCA) ports.

A single vNIC in the IB fabric may or may not be allocated with a hardware vNIC context recorded in the hardware vNIC context table 232. In the example as shown in FIG. 2, vNIC a 221, vNIC b 222, and vNIC c 223 on host server A 204, and vNIC d 224 on host server B 205, can be provided with a hardware vNIC context (i.e. the gateway instance 201 can obtain the correct host HCA port address on the IB fabric and QPN within that HCA for an incoming data packet). Additionally, vNIC e 225 on host server B 205 is not allocated with hardware vNIC context 232 and can only be used in a bridged Ethernet context. In one example, if the complete gateway hardware vNIC contexts in the hardware vNIC context table 232 are consumed by the network managed vNICs, e.g. vNICs a-d 221-224, then all bridge based vNICs, e.g. vNIC e 225, can be flooding based (i.e. not having any dedicated HW vNIC context).

A flooding mechanism can be used to scale the number of logical vNICs beyond the size of the gateway HW vNIC context table. Using the flood-based vNICs, the system allows the same amount of receive queues on the host(s) to receive packets for a large number of logical vNICs. Furthermore, using a flooding mechanism, the system allows schemes where hardware vNIC contexts can be established in the hardware context table 232 after initial packet traffic from the external Ethernet has been received.

Virtual Machine (VM) Migration

Figure 3:
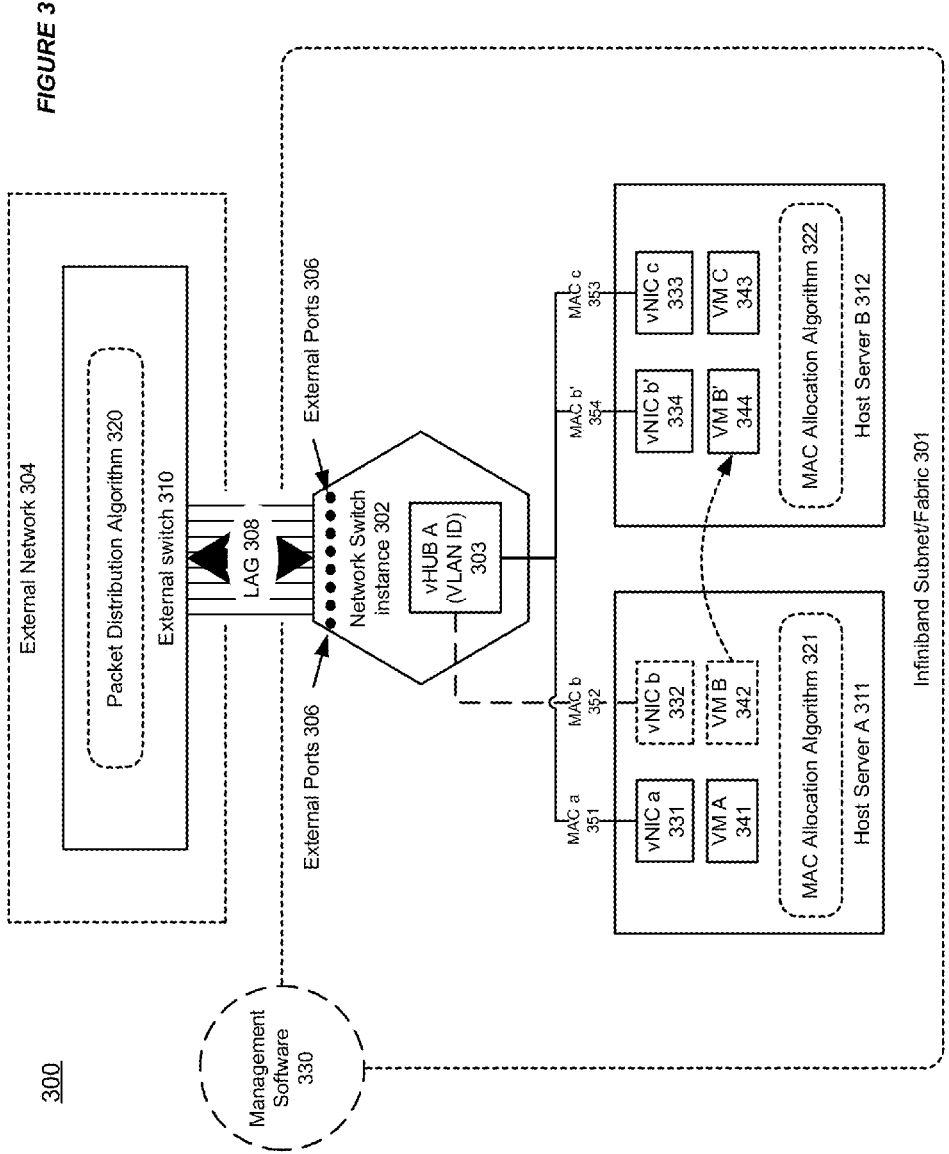
FIG. 3 shows an illustration of a middleware machine environment that supports virtual machine migration in a middleware machine environment, in accordance with an embodiment of the invention.

FIG. 3 shows an illustration of a middleware machine environment that supports virtual machine migration in a middleware machine environment, in accordance with an embodiment of the invention. As shown in FIG. 3, a middleware machine environment 300 can comprise a network switch instance 302 in an IB fabric 301 that connects to an external switch 310 in an external network 304, e.g. using a link aggregation (LAG) component 308.

The network switch 302 (or switches) can include one or more external ports 306 that are adapted to receive one or more data packets from the external network 304. Furthermore, the IB fabric 301 can include one or more host servers, e.g. host servers A-B 311-312, each of which can support one or more virtual machines for processing the received data packets. For example, host server A 311 supports VMs A-B 341-342, and host server B 312 supports VM C 343.

Additionally, the network switch 302 can maintain one or more virtual hubs, e.g. vHUB A 303 (with a unique VLAN ID). The vHUB A 303 can include various vNICs a-c 331-333, each of which is assigned with a MAC address 351-353.

Furthermore, the external switch 310 in the external network 304, e.g. an external Ethernet switch for the relevant LAG 308 based connection(s), can direct a data packet to a particular external port 306 based on a packet distribution algorithm 320. Then, the network switch 302 can send the packet received at an external port 306 to a corresponding virtual machine for processing the received data packet, e.g. using a direct packet forwarding mechanism.

As shown in FIG. 3, each host server A-B 311-312 can have a separate address allocation algorithm, e.g. a per host MAC allocation algorithm 321-322. The MAC allocation algorithm 321-322 can correspond to, or be matched with, the MAC based packet distribution algorithm 320 of the external switch 310. When a static distribution of virtual machines is used across physical host servers A-B 311-312, the probability of hitting the correct external port 306, by the external switch 310 using the MAC based packet distribution algorithm 320, can be increased, if the MAC allocation function 321 for a virtual machine, VM A 341, is influenced by the physical server A 311.

In accordance with an embodiment of the invention, the middleware machine environment 300 allows dynamic virtual machine migration among different physical servers. As shown in FIG. 3, at runtime, VM B 342 on host server A 311 is allowed to migrate from host server A 311 to become VM B' 344 on host server B 312.

In order to support the dynamic virtual machine migration, the MAC addresses associated with the migrated virtual machine can be updated to indicate the target HCA port. The new MAC address can correspond to the distribution of packets to a new host server, e.g. host server B 312. The new MAC address can be either assigned with a completely new MAC value or just updating one or more bits that are used to indicate a physical server and an eternal port in the packet distribution algorithm. On the other hand, if the corrected MAC address for a migrated virtual machine is not updated, then the optimal distribution of MAC addresses 351-353 may degrade over time.

As shown in FIG. 3, a system management software 330 can configure both the LAG packet distribution function 320 of the external switch 310 and the per host MAC allocation algorithm 321-322 on the various host servers A-B 311-312 to operate in concert. After VM B 342 migrated to become VM B' 344, the management software 330 can simply change the MAC address associated with VM B' 344 from MAC b' 354 to MAC b 352 so that the external switch 310 can send data packets to VM B' 344, instead of for VM B 342, potentially via a different external port 306 at runtime.

In accordance with an embodiment of the invention, a server specific MAC model can be used to support dynamic virtual machine migration. As shown in FIG. 3, a virtual machine, e.g. VM B 342 (or VM B' 344 after migration), can maintain multiple logical slave virtual interfaces, e.g. vNIC b 332 and vNIC b' 334. Each slave interface, vNIC b 332 or vNIC b' 334, can have a different MAC address, MAC b 352 or MAC b' 354, that corresponds to a MAC allocation algorithm on a host server that the VM B 342 is allowed to migrate to, e.g. MAC allocation algorithm 321 on host server A 311 or MAC allocation algorithm 322 on host server B 312. Then, a bonding scheme on top of the set of slave virtual interface can select a slave virtual interface as the activated virtual interface, based on which server the virtual machine is currently running on. For example, the bonding scheme can select MAC b 352 associated with vNIC b 332 as the activated MAC address for VM B 342 before migration, and the bonding scheme can select MAC b' 354 associated with vNIC b' 334 as the activated MAC address for VM B 342 after VM B 342 migrates to become VM B' 344.

Figure 4:
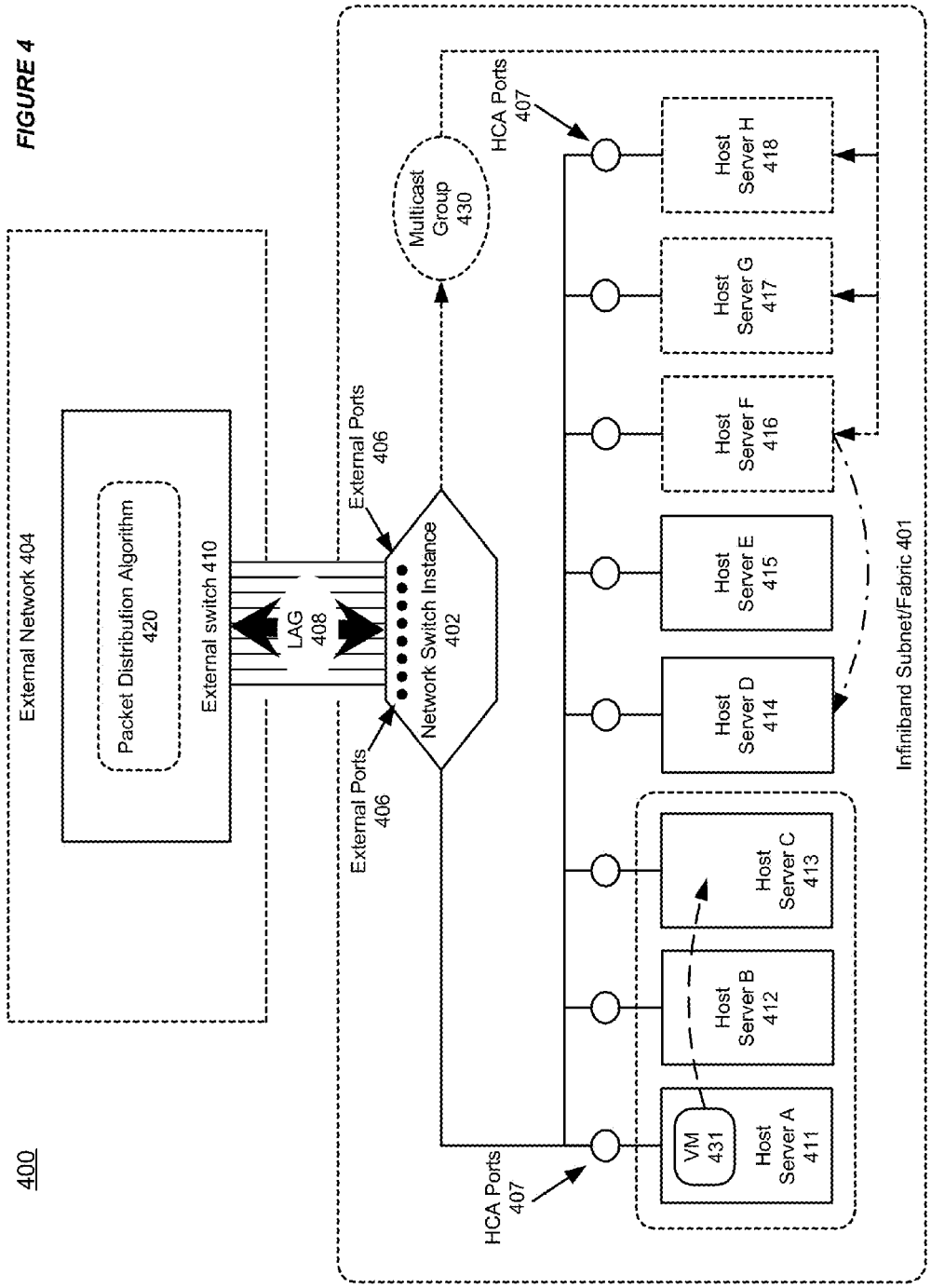
FIG. 4 shows an illustration of a middleware machine environment that supports dynamic virtual machine migration based on packet forwarding in a middleware machine environment, in accordance with an embodiment of the invention.

FIG. 4 shows an illustration of a middleware machine environment that supports dynamic virtual machine migration based on packet forwarding in a middleware machine environment, in accordance with an embodiment of the invention. As shown in FIG. 4, a middleware machine environment 400 can comprise a network switch instance 402 in an IB fabric 401 that connects to an external switch 410 in an external network 404, e.g. using a link aggregation (LAG) component 408. The network switch instance 401 can include one or more external ports 406 that are adapted to receive one or more data packets from the external network 404. Then, the network switch instance 402 can send the received one or more data packets to different HCA ports 407 associated with a plurality of host servers A-H 411-418.

In accordance with an embodiment of the invention, the middleware machine environment 400 can restrict the migration of a virtual machine, e.g. VM A 43, to only a set of servers, e.g. host servers A-C 411-413. Furthermore, there are situations when the destination virtual machine for an incoming data packet is not on the host server associated with the targeted HCA port 407 by the external switch 410 based on the packet distribution algorithm 420. In these situations, the system can use a packet forwarding mechanism, e.g. a unicast based intermediate forwarding scheme, to forward the received packet to the correct host server in the IB fabric 401.

Furthermore, the system can switch from the unicast based intermediate forwarding scheme to a multicast based scheme for sending incoming data packets to the destination virtual machines on different host servers, e.g. when the number of the virtual machines, which use a set of MAC addresses associated with a particular LAG port and are not running on corresponding host servers, exceeds a threshold. Additionally, a physical server, e.g. host server H 418, can join a multicast group 430 for receiving incoming data packets, when the host server H 418 hosts a plurality of virtual machines, the number of which use the set of MAC addresses associated with a particular LAG port exceeds a threshold.

Additionally, each member server within a multicast group 430 can be responsible for forwarding incoming data packets to a unique subset of the servers that are not currently members of the multicast group, e.g. using a proxy based scheme. Thus, the servers within the multicast group 430, e.g. host servers F-H 416-418, can forward only one copy of an incoming data packet to virtual machines on a server outside the multicast group, e.g. host server D 414 or host server E 415.

Figure 5:
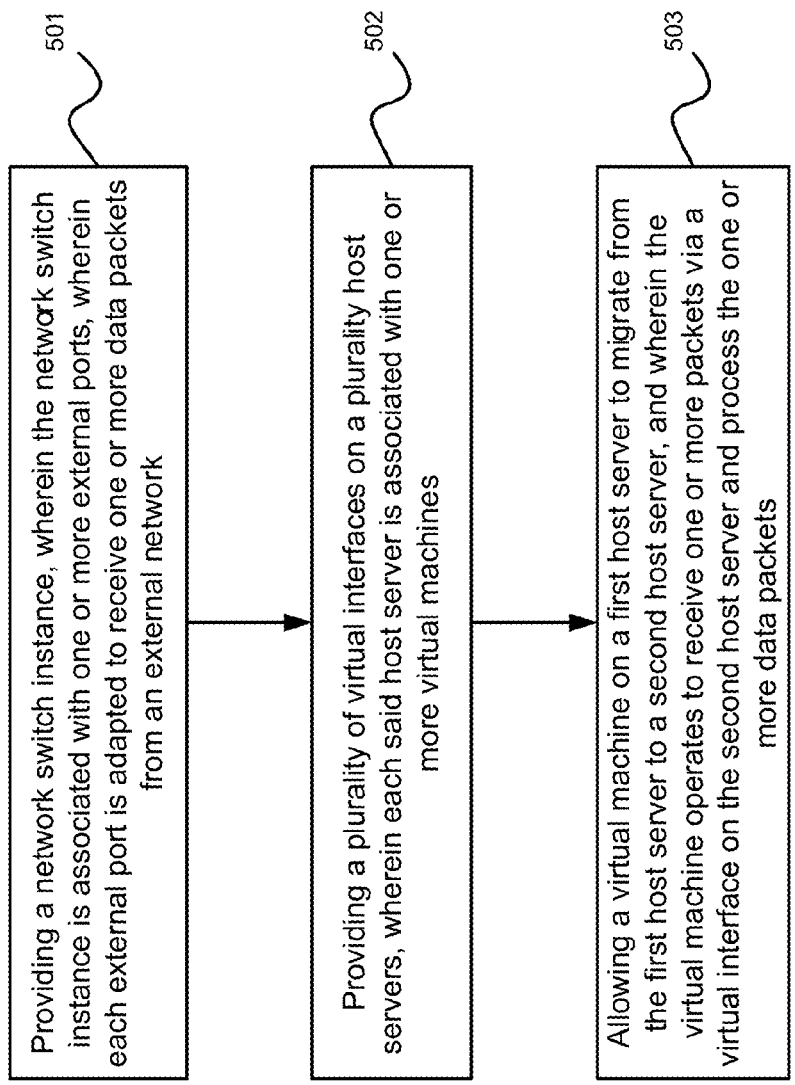
FIG. 5 illustrates an exemplary flow chart for supporting virtual machine migration in a middleware machine environment, in accordance with an embodiment of the invention.

FIG. 5 illustrates an exemplary flow chart for supporting direct packet forwarding in a middleware machine environment, in accordance with an embodiment of the invention. As shown in FIG. 5, at step 501, the middleware machine environment can provide a network switch instance, wherein the network switch instance is associated with one or more external ports, each of which is adapted to receive one or more data packets from an external network. Then, at step 502, there can be a plurality of virtual interfaces on a plurality host servers, wherein each said host server is associated with one or more virtual machines. Additionally, at step 503, a virtual machine on a first host server is allowed to migrate from the first host server to a second host server, and wherein the virtual machine operates to receive one or more packets via a virtual interface on the second host server and process the one or more data packets.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for supporting virtual machine migration in a middleware machine environment, comprising:
   one or more microprocessors, wherein the system operates on the one or more microprocessors;
   a network switch instance, wherein the network switch instance is associated with one or more external ports, wherein each external port that is adapted to receive one or more data packets from an external network;
   a plurality of virtual interfaces on a plurality host servers, wherein each said host server is associated with one or more virtual machines; and
   wherein a virtual machine on a first host server is allowed to migrate from the first host server to a second host server and operates to receive one or more packets via a virtual interface on the second host server and process the one or more data packets;
   wherein a network identifier associated with the virtual machine is changed from a physical machine identifier of the first host server to a physical machine identifier of the second host server after the virtual machine migrates from the first host server to the second host server.

2. The system according to claim 1, wherein:
   the virtual machine is allowed to migrate to only a set of host servers.

3. The system according to claim 2, wherein:
   the virtual machine is associated with a plurality of slave virtual interfaces, wherein each slave virtual interface has a MAC address that corresponds to a virtual interface on one host server in the set of host servers that the virtual machine is allowed to migrate to.

4. The system according to claim 3, wherein:
   a bonding scheme is used by the virtual machine to activate a slave virtual interface on a host server that the virtual machine is currently running on.

5. The system according to claim 2, wherein:
   the network switch instance operates to send a data packet to a virtual interface associated with a virtual machine on another host server based on either a multicast group based scheme or an intermediate forwarding scheme.

6. The system according to claim 1, further comprising:
   an external switch in the external network, wherein the external switch uses a packet distribution algorithm to decide to which external port on the network switch instance a packet should be sent.

7. The system according to claim 6, wherein:
   an address allocation algorithm is used by each said host server to allocate an address to a virtual interface associated with a virtual machine, wherein the address allocation algorithm corresponds to the packet distribution algorithm of the external switch.

8. The system according to claim 1, wherein:
   the second host server allows for updating a virtual interface address associated with the virtual machine after it migrates from the first host server to the second host server.

9. The system according to claim 1, further comprising:
   a system management software component that is used to configure both a packet distribution algorithm on a external switch and an address allocation algorithm on each host server.

10. The system according to claim 1, wherein:
    the network address associated with the virtual machine is a MAC address changed from an old address to a new address after the virtual machine migrates from the first host server to the second host server, wherein the new address corresponds to the distribution of packets to the second host server and the change involves either assigning a completely new MAC value or updating one or more bits that are used to indicate a physical server and an external port in the packet distribution algorithm.

11. A method for supporting virtual machine migration in a middleware machine environment operating on one or more microprocessors, comprising:
    providing a network switch instance, wherein the network switch instance is associated with one or more external ports, wherein each external port is adapted to receive one or more data packets from an external network;
    providing a plurality of virtual interfaces on a plurality host servers, wherein each said host server is associated with one or more virtual machines; and
    allowing a virtual machine on a first host server to migrate from the first host server to a second host server, and wherein the virtual machine operates to receive one or more packets via a virtual interface on the second host server and process the one or more data packets;
    changing a network identifier associated with the virtual machine from a physical machine identifier of the first host server to a physical machine identifier of the second host server after the virtual machine migrates from the first host server to the second host server.

12. The method according to claim 11, further comprising:
allowing the virtual machine to migrate to only a set of host servers.

13. The method according to claim 12, further comprising:
allowing the virtual machine to be associated with a plurality of slave virtual interfaces, wherein each slave virtual interface has a MAC address that corresponds to a virtual interface on one host server in the set of host servers that the virtual machine is allowed to migrate to, and
using, via the virtual machine, a bonding scheme to activate a slave virtual interface on a host server that the virtual machine is currently running on.

14. The method according to claim 12, further comprising:
sending, via the network switch instance, a data packet to a virtual interface associated with a virtual machine on another host server based on either a multicast group based scheme or an intermediate forwarding scheme.

15. The method according to claim 11, further comprising:
allowing an external switch in the external network to use a packet distribution algorithm to decide to which external port on the network switch instance a packet should be sent.

16. The method according to claim 15, further comprising:
allowing each said host server to use an address allocation algorithm to allocate an address to a virtual interface associated with a virtual machine, and wherein the address allocation algorithm corresponds to the packet distribution algorithm of the external switch.

17. The method according to claim 11, further comprising:
allowing for updating a virtual interface address associated with the virtual machine after it migrates from the first host server to the second host server.

18. The method according to claim 11, further comprising:
providing a system management software component that is used to configure both a packet distribution algorithm on a external switch and an address allocation algorithm on each host server.

19. The method according to claim 11, further comprising:
changing a MAC address associated with the virtual machine from an old address to a new address after the virtual machine migrates from the first host server to the second host server, wherein the new address corresponds to the distribution of packets to the second host server and the change involves either assigning a completely new MAC value or updating one or more bits that are used to indicate a physical server and an external port in the packet distribution algorithm.

20. A non-transitory machine readable storage medium having instructions stored thereon for supporting virtual machine migration in a middleware machine environment that when executed cause a system to perform the steps of:
providing a network switch instance, wherein the network switch instance is associated with one or more external ports, wherein each external port is adapted to receive one or more data packets from an external network;
providing a plurality of virtual interfaces on a plurality host servers, wherein each said host server is associated with one or more virtual machines; and
allowing a virtual machine on a first host server to migrate from the first host server to a second host server, and wherein the virtual machine operates to receive one or more packets via a virtual interface on the second host server and process the one or more data packets;
changing a network identifier associated with the virtual machine from a physical machine identifier of the first host server to a physical machine identifier of the second host server after the virtual machine migrates from the first host server to the second host server.

* * * * *